(12) United States Patent
Lindblad et al.

(10) Patent No.: US 11,074,156 B1
(45) Date of Patent: Jul. 27, 2021

(54) DEBUG ADAPTER TO FACILITATE SERVER-SIDE JAVASCRIPT DEBUGGING

(71) Applicant: MARKLOGIC CORPORATION, San Carlos, CA (US)

(72) Inventors: Christopher Lindblad, San Carlos, CA (US); Nupoor Kotasthane, San Carlos, CA (US)

(73) Assignee: MarkLogic Corporation, San Carlos, CA (US)

( * ) Notice: Subject to any disclaimer, the term of this patent is extended or adjusted under 35 U.S.C. 154(b) by 0 days.

(21) Appl. No.: 16/841,469

(22) Filed: Apr. 6, 2020

(51) Int. Cl.
  *G06F 9/44* (2018.01)
  *G06F 11/36* (2006.01)
  *G06F 9/455* (2018.01)

(52) U.S. Cl.
  CPC ...... *G06F 11/3664* (2013.01); *G06F 9/45529* (2013.01); *G06F 11/3644* (2013.01)

(58) Field of Classification Search
  None
  See application file for complete search history.

(56) References Cited

U.S. PATENT DOCUMENTS

| | | | | |
|---|---|---|---|---|
| 2015/0149417 A1* | 5/2015 | Foebel | ............ | H04L 67/02 707/687 |
| 2015/0309916 A1* | 10/2015 | Chen | ............ | H04W 88/182 717/125 |
| 2018/0121320 A1* | 5/2018 | Dolby | ............ | G06F 11/3608 |
| 2018/0300218 A1* | 10/2018 | Lipka | ............ | G06F 11/3664 |
| 2020/0004598 A1* | 1/2020 | Brebner | ............ | H04L 67/141 |

\* cited by examiner

*Primary Examiner* — Insun Kang
(74) *Attorney, Agent, or Firm* — Cooley LLP

(57) ABSTRACT

A non-transitory computer readable storage medium has instructions executed by a processor to receive a debug adapter request. A HyperText Transfer Protocol (HTTP) request is generated from the debug adapter request. A debug request is derived from the HTTP request. Privilege to submit the debug request is confirmed. A string serialized JavaScript Object Notation (JSON) debug request is submitted to a JavaScript Engine. A string serialized JSON debug response from the JavaScript Engine is received. A JSON debug response is formed from the string serialized JSON debug response. An HTTP response is prepared from the JSON debug response. A debug adapter response based upon the HTTP response is submitted.

9 Claims, 2 Drawing Sheets

US 11,074,156 B1

DEBUG ADAPTER TO FACILITATE SERVER-SIDE JAVASCRIPT DEBUGGING

FIELD OF THE INVENTION

This invention relates generally to debugging computer programs. More particularly, this invention is directed toward a debug adapter to facilitate server-side JavaScript debugging.

BACKGROUND OF THE INVENTION

A debugger is a computer program used to test and verify the correct operation of a target computer program. Visual Studio Code® is a debugging tool sold by Microsoft® Corporation, Redmond, Wash.

JavaScript is a programming language that enables interactive web pages. Most websites use JavaScript for client-side page activity. All major web browsers have a dedicated JavaScript engine.

V8 is an open-source JavaScript engine for web browsers distributed by Google®, Mountain View, Calif. The V8 JavaScript engine has an inspector protocol with debugging functionality.

Node.js integrates with V8's Inspector protocol. Node.js is a single threaded system that exposes the debugger functionality through socket connections and talks to debugging tools via these socket connections. This approach imposes security risks and is very difficult to implement for a multithreaded system. Unlike a single threaded system, which processes one command at a time, a multithreaded system allows multiple threads (i.e., components of a process) to execute concurrently by sharing resources associated with the process.

A web server is server software that can satisfy client requests on the World Wide Web. A web server processes incoming network requests over Hypertext Transfer Protocol (HTTP). Pages delivered are typically Hypertext Markup Language (HTML) documents, which may include images, style sheets, scripts and text. A web server is often used in conjunction with a database server. The web server receives requests and then queries the database to service the requests. MarkLogic® Corporation, San Carlos, Calif. distributes a multi-model database designed to support multiple data models such as a document database, a graph triple-store, a spatial database, a binary database and a relational database or sub-combinations thereof. The multi-model database is multithreaded.

A debugging tool, a web server and a multithreaded multi-model database typically have distinct communication interfaces. Accordingly, there is a need to provide debugging capabilities across different communication interfaces associated with a debugging tool, a web server and a multi-threaded multi-model database.

SUMMARY OF THE INVENTION

A non-transitory computer readable storage medium has instructions executed by a processor to receive a debug adapter request. A HyperText Transfer Protocol (HTTP) request is generated from the debug adapter request. A debug request is derived from the HTTP request. Privilege to submit the debug request is confirmed. A string serialized JavaScript Object Notation (JSON) debug request is submitted to a JavaScript Engine. A string serialized JSON debug response from the JavaScript Engine is received. A JSON debug response is formed from the string serialized JSON debug response. An HTTP response is prepared from the JSON debug response. A debug adapter response based upon the HTTP response is submitted.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
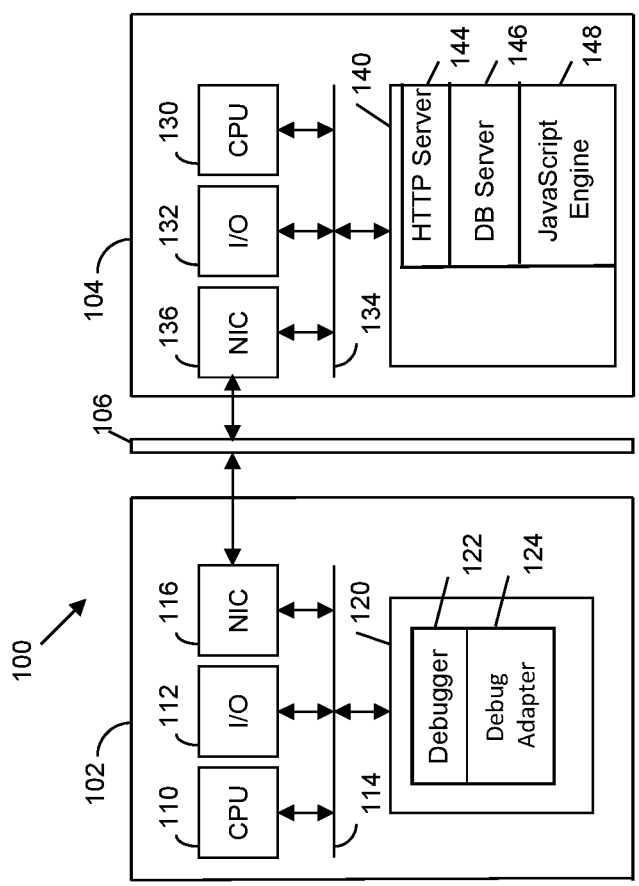
FIG. 1 illustrates a system configured in accordance with an embodiment of the invention.

FIG. 1 illustrates a system 100 with a client machine 102 in communication with a server 104 via a network 106, which may be any combination of wired and wireless networks. Client device 102 includes a processor (e.g., central processing unit) 110 connected to input/output devices 112 via a bus 114. The input/output devices 112 may include a keyboard, mouse, touch display and the like. A network interface circuit 116 provides connectivity to network 106. A memory 120 is also connected to the bus 114. The memory 120 stores a debugger 122, such Visual Studio Code®. The debugger 122 is augmented with a debug adapter 124. In one embodiment, the debug adapter 124 is supplied from server 104.

Server 104 includes a processor 130, input/output devices 132, bus 134 and network interface circuit 136. A memory 140 is connected to bus 134. The memory 140 stores an HTTP server 144 that interacts with database server 146, which in turn communicates with a JavaScript engine 148. The database server 146 is a multithreaded multi-model database, such as sold by MarkLogic® Corporation. In one embodiment, the JavaScript engine 148 is the V8 JavaScript engine.

The debug adapter 124 converts a debug request from debugger 122 into an HTTP requests that is sent to HTTP server 144. The debug adapter 124 processes a response in a JavaScript Object Notation (JSON) format and provides a debug adapter response to the debugger 122. The DB server 146 ensures security by checking if the user has the right privileges to debug the JavaScript request.

The debug adapter 124 uses a query/scripting language level debugging API. The debug adapter 124 uniquely uses HTTP as the protocol to connect the debugger 122 to the server 144 as opposed to socket connections that some debugging tools use. The DB server 146 has the capability to execute debug operations against a specific JavaScript request in an environment where multiple requests may be running concurrently.

JavaScript is debugged from an Integrated Development Environment (IDE) or debugger 122. The debug adapter 124 implements a JavaScript debugger that can be used in a tool like Visual Studio Code® to debug JavaScript. The database server 146 integrates with the JavaScript engine 148, in one embodiment, the V8's Inspector protocol. The V8 engine has a debugger implementation that can be leveraged to expose debugging functionality. The Inspector protocol communicates with external systems through string serialized JSON objects. The way to communicate with V8's debugger is to send it a message in the form of a string serialized JSON object, which contains the exact debug operation to perform and the required parameters. V8 Inspector, on receiving the message, supplies a response that indicates either a successful execution of the debug operation or a failure. Some examples of basic debug operations are "pause", "resume", "setting a breakpoint", "inspecting a variable" and "resume". V8 also periodically sends notifications to indicate certain events. The notifications and responses are communicated back to the sender through string serialized JSON. These strings are parsed to check if an operation was successful.

In one embodiment, debug functions are exposed through a Representational State Transfer (REST) Application Program Interface (API). External systems can access the debugger functions in the server through these REST APIs. In one embodiment, a debug extension for Visual Studio Code® is formed using the Debug Adapter Protocol (DAP) from Microsoft® Corporation. The debug extension is a container for the debug adapter 124. The debugging tools usually use a generic debug User Interface (UI). Visual Studio Code also uses a generic UI to allow users to debug various languages. To enable integration of this debug UI in the tool with the JavaScript debugger implementation in the server, one needs an intermediary. This intermediary is the debug adapter 124. The end user can install the debug extension in Visual Studio Code and then use the GUI to debug JavaScript running on the server 104. The debug adapter 124 makes an HTTP connection to the HTTP server 144 running the JavaScript to be debugged. The adapter 124 uses the previously mentioned REST APIs in the server to execute debug operations. This ensures secure communication between the debugging tool 122 and the server 144. The DB server 146 is configured to make sure that the user has the required privileges to debug. In MarkLogic DB server 146, the user performing the debug operations has to have debug privileges. There are two types of debug privileges. The user has to have one or both of them depending on the type of request. A "debug-any-requests" privilege is required to debug all requests from any user. A "debug-my-requests" is required to debug a specified user's request. These privileges are defined in the server 146.

The debugging tool 122 sends debug commands to the debug adapter 124 and the debug adapter 124 forwards those commands to the JavaScript debugger 148 via DB server 146 and HTTP server 144. The DB server 146 processes the debug request and creates a response to send back to the adapter 124 via HTTP server 144. The adapter 124 processes the response and sends it back to the debugging tool 122. All communication between the debugging tool or debugger 122 and the adapter 124 is done using Debug Adapter Protocol and all communication between the adapter 124 and the HTTP server 144 is done using HTTP protocol.

The DB server 146 maintains some debug information pertaining to each request that is being debugged. Each request has its own environment, which is isolated from environments of other requests. The server 146 maintains stack trace information of the debugged request. The server 146 also maintains the list of breakpoints set on the current request. This facilitates lookup of some of information. Each time the request enters the "paused" state, the stack trace is updated. Each time the user sets or deletes a breakpoint, the server 146 updates memory and sends a message to V8 Inspector to perform the operation of creation or deletion of the breakpoint. The server 146 makes use of multithreaded aspects of the debugger implementation. The debug requests sent to the server 146 are treated in a separate thread (for most type of debug requests) and if they require talking to the Inspector for the execution of the debug operation, they are then read and executed in the thread that is executing the request being debugged. Once the debug operation is executed, the debugged thread writes the Inspector response and notifications to a shared memory structure and the debugger thread then reads the responses and notifications from the same shared memory structure, and returns them to the client. The server also tracks responses and notifications on a per request basis.

Figure 2:
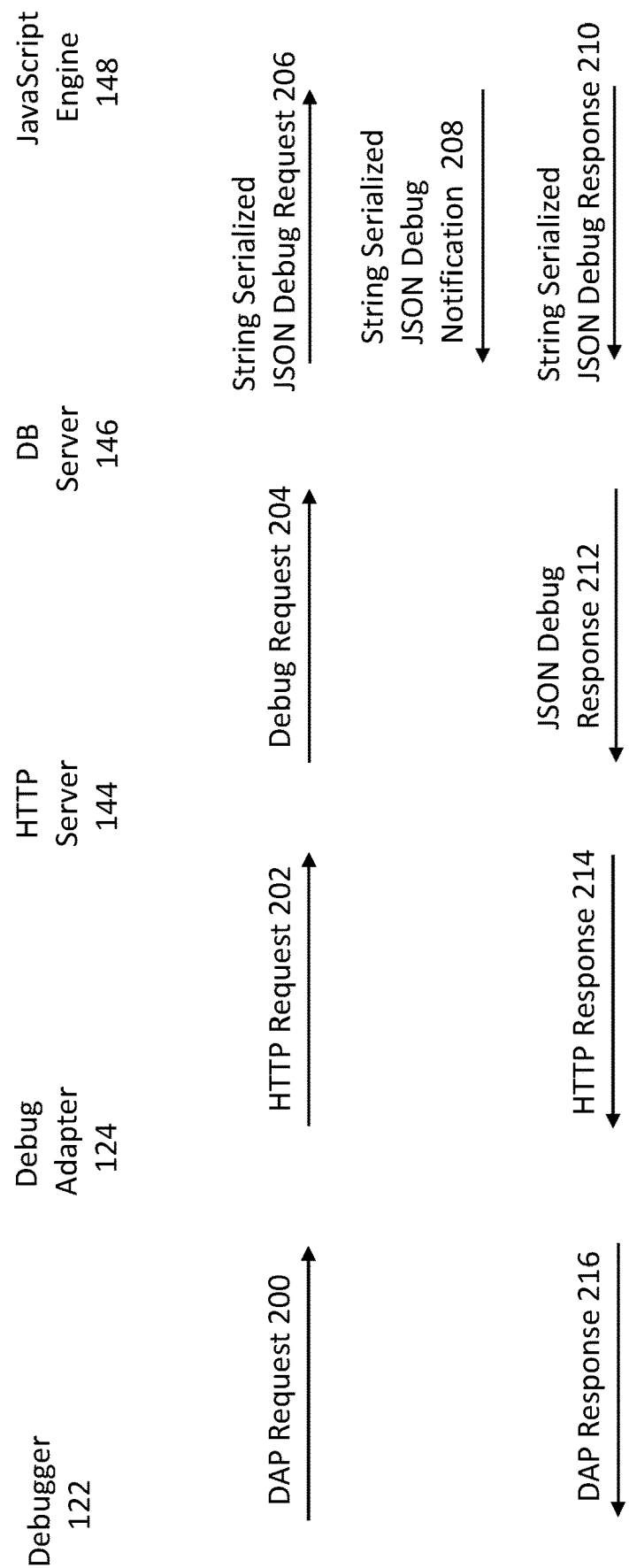
FIG. 2 illustrates processing associated with different modules implementing operations associated with the invention.

The foregoing is more fully appreciated with a specific example. Consider a case where a user is operating debugger 122. The user clicks on the "Step Over" icon in the debugging tool (in this case Visual Studio Code) while debugging a request. When the user clicks the icon, the debugging tool sends a DAP request to the adapter 124 in the following format: next({"threadId":1}. FIG. 2 illustrates DAP request 200 from debugger 122 to debug adapter 124.

Once the adapter 124 receives the DAP request, it sends an HTTP POST request to HTTP server 144, as shown with arrow 202 of FIG. 2. The HTTP request is a REST API on the server and for the "step over" request, it will look like this:

http://host:8002/jsdbg/v1/step-over/{request-id}

The "request-id" is an unsigned long integer id of the request that is being debugged. It can be obtained from the server through other APIs. Once the HTTP request is received by the HTTP server 144, the server 144 calls appropriate debugger built-in function to process the request. FIG. 2 illustrates a debug request 204 from HTTP server 144 to DB server 146. In this case, the function called will be:

jsdbg.stepOver($requestId as Number) as Object where $requestId is the ID of the request being debugged in the server. This function constructs a string serialized JSON message that is sent to the JavaScript engine 148 (e.g., V8 Inspector) for the final processing of the "step over" debug request. This is shown as JSON debug request 206 in FIG. 2. In this case the string serialized JSON message will look like this:

{"id":"3, "method": "Debugger.stepOver"}

Note: "id" is a number generated by the server dynamically.

The JavaScript Engine 148 may send back a string serialized JSON debug notification 208 to the DB server 146. The JavaScript Engine 148 (e.g., V8 Inspector) processes this request and sends back a string serialized JSON response 210. For example, the response may be:

{"id":3,"result":{ }}

Note: same "id" that server sent to V8. Additional notifications may be included with the response, such as:

{"method": "Debugger.resumed", "params": { }}
{"method": "Debugger.paused","params": {"callFrames": [{"callFrameId": "{\" ordin al\":0,\"injectedScriptId\":1}","functionName":" ","functionLocation": {"scriptId":"16","lineNumber":0, "columnNumber":0},"location": {"scriptId":"16", "lineNumber":1,"columnNumber":0},"url":"/sleepmod.sjs","scopeChain": [{"type":"global", "object": {"type":"object","className": "global", "description": "global","objectId": "{†"injectedScriptId\":1, \"id\":3"}}],"this": {"type": "object","className":"global","description": "global","objectId":"{\"injectedScriptId\":1, \"id\": 4"}}],"reason":"other", "hitBreakpoints": [ ]}}

The database server 146 transforms the string serialized JSON into a JSON object:
```
{
"id":3,
"result": {
}
}
```
The HTTP server 144 then packages this JSON response into an HTTP response 214, such as:
```
HTTP/1.1 200 OK
Content-type: application/json; charset=UTF-8
Server: MarkLogic
Content-Length: 21
Connection: Keep-Alive
Keep-Alive: timeout=5
{"id":3 "result":{ }}
```
The adapter 124 prepare a DAP response 216:
{"seq":0,"type":"response","request seq":9,"command": "next","success":true}
In this case it also sends back an event:
{"seq":0,"type":"event","event":"stopped","body": {"reason":"step","threadId":1}}

Another example is a user that sets a breakpoint using the user interface in the debugging tool. The DAP request 200 sent by the debugger tool 122 may be:
setBreakpoints({"source": {"name": "sleepmod.sjs", "path": "/space/projects/javascript-debugger/adapter/workspace/sleepmod.sjs","sourceReference":0, "adapter Data":"ml-adapter-data"}, "lines": [5],"breakpoints": [{"line":5} ],"sourceModified":false})

The HTTP POST request 202 sent by the adapter 124:
http://host:8002/v1/jsdbg/set-breakpoint/{requestid}

The HTTP request supports the following URL parameters:
url=URL of the script (optional)
lno=line number (required)
cno=column number (required)
condition=condition for breakpoint (optional)
For Example:
http://nkotasth-z640:8002/jsdbg/v1/set-breakpoint/6909818122771768755?url=/sleepmod.sjs&lno=5

The built-in function that is invoked by the above REST API:
jsdbg.setBreakpoint($requestId as String, $location as jsdbg.location, [$condition as String?]) as Object
where $requestId is the ID of the request being debugged in the server, $location is a MarkLogic object type created by calling the following constructor:
jsdbg.location($url as String, $lineNumber as Number, [$columnNumber as Number?]) as jsdbg.location,
$condition is an optional breakpoint condition.

The function above creates a string serialized JSON debug request 206 containing the necessary information to create a breakpoint and sends it to the JavaScript engine 148:
{"id":4,"method":"Debugger.setBreakpointByUrl", "params": {"lineNumber":5, "columnNumber":0, "url":"/sleepmod.sjs"}}

The JavaScript engine 148 sends a string serialized JSON debug response 210:
{"id":4,"result":{"breakpointId": "1:4:0:/sleepmod.sjs", "locations": [{"scriptId": "16", "lineNumber":4,"columnNumber":0}]}}

The built-in function turns the above string into a JSON object:
```
{
"id":4,
"result":
{
"breakpointId": "1:4:0:/sleepmod.sjs ",
"locations":
[
{
"scriptId": "16",
"lineNumber":4,
"columnNumber":0
}
]
}
}
```

The string serialized JSON debug response 210 is processed by the DB server 146 to produce a JSON debug response 212. The HTTP server 144 then produces an HTTP response 214:
```
HTTP/1.1 200 OK
Content-type: application/json; charset=UTF-8
Server: MarkLogic
Content-Length: 126
Connection: Keep-Alive
Keep-Alive: timeout=5
{"id":4,"result": {"breakpointId":"1:4:0:/sleepmod.sjs", "locations": [{"scriptId":"16", "lineNumber":4,"columnNumber":0}]}}
```
The adapter 124 responds to the debugging tool 122 with the following response DAP response 216:
{"seq":0,"type":"response","request seq":13,"command":"setBreakpoints","success":true, "body": {"breakpoints": [{"verified":true,"line":5}]}}

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:
  receive a debug adapter request from a debugger,
  generate a HyperText Transfer Protocol (HTTP) request from the debug adapter request,
  derive a debug request from the HTTP request,
  confirm a user privilege to submit the debug request,
  submit a string serialized JavaScript Object Notation (JSON) debug request generated from the debug request to a JavaScript Engine,
  receive a string serialized JSON debug response for the string serialized JSON debug request from the JavaScript Engine,
  form a JSON debug response from the string serialized JSON debug response,
  generate an HTTP response from the JSON debug response, and
  submit a debug adapter response for the debug adapter request based upon the HTTP response to the debugger.

2. The non-transitory computer readable storage medium of claim 1 wherein the HTTP request is generated by a debug adapter that is an extension of the debugger.

3. The non-transitory computer readable storage medium of claim 1 wherein an HTTP server derives the debug request from the HTTP request.

4. The non-transitory computer readable storage medium of claim 1 wherein a database server submits the string serialized JSON debug request to the JavaScript Engine.

5. The non-transitory computer readable storage medium of claim 1 wherein a database server forms the JSON debug response from the string serialized JSON debug response.

6. The non-transitory computer readable storage medium of claim 1 wherein the HTTP response is prepared by an HTTP server.

7. The non-transitory computer readable storage medium of claim 1 wherein a debug adapter submits the debug adapter response.

8. The non-transitory computer readable storage medium of claim 1 wherein the string serialized JSON debug request is formed by a multithreaded multi-model database.

9. The non-transitory computer readable storage medium of claim 1 wherein privilege to submit the debug request is confirmed by a multithreaded multi-model database.

* * * * *